(12) United States Patent
Townsley et al.

(10) Patent No.: US 12,375,463 B2
(45) Date of Patent: Jul. 29, 2025

(54) INTERNET PROTOCOL SECURITY AND SECURITY PARAMETER INDEX SUMMARIZATION AND DATA ROUTING

(71) Applicant: Cisco Technology, Inc., San Jose, CA (US)

(72) Inventors: William Mark Townsley, San Francisco, CA (US); Edward Albert Warnicke, Austin, TX (US); Jerome Tollet, Paris (FR); Aloys Augustin, Versaille (FR); Andrew Yourtchenko, Diegem (BE); Giles Douglas Yorke Heron, London (GB)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 18/139,871

(22) Filed: Apr. 26, 2023

(65) Prior Publication Data

US 2024/0364669 A1 Oct. 31, 2024

(51) Int. Cl.
*H04L 9/40* (2022.01)
*H04L 45/24* (2022.01)
*H04L 45/745* (2022.01)

(52) U.S. Cl.
CPC .......... *H04L 63/0485* (2013.01); *H04L 45/24* (2013.01); *H04L 45/745* (2013.01)

(58) Field of Classification Search
CPC .... H04L 63/0485; H04L 45/24; H04L 45/745
USPC .................................................. 726/14
See application file for complete search history.

(56) References Cited

U.S. PATENT DOCUMENTS

| | | | |
|---|---|---|---|
| 7,434,045 B1 | 10/2008 | Enderwick et al. | |
| 11,477,176 B1 * | 10/2022 | Gupta | H04L 63/0428 |
| 2006/0104308 A1 | 5/2006 | Pinkerton et al. | |
| 2019/0020684 A1 | 1/2019 | Qian et al. | |
| 2020/0120078 A1 | 4/2020 | Mao et al. | |

FOREIGN PATENT DOCUMENTS

WO  WO2022143399 A1  7/2022

* cited by examiner

*Primary Examiner* — Michael S McNally
(74) *Attorney, Agent, or Firm* — Lee & Hayes, P.C.

(57) ABSTRACT

Techniques for routing Internet Protocol security (IPsec) data packets. An index is assigned to a Security Parameter Index (SPI) header of the IPsec data packet. The index includes information for routing the data packet to a particular Encapsulating Security Payload (ESP) processor. The data packet can be routed using techniques that are analogous to conventional routing protocols such as IPv4 routing protocol. This allows the data packet to be routed using less expensive routing protocols rather than relying solely on more expensive load balancing techniques to route the data packet. This also advantageously allows the data packet to be routed employing routing techniques developed over decades of routing protocol development.

20 Claims, 8 Drawing Sheets

INTERNET PROTOCOL SECURITY AND SECURITY PARAMETER INDEX SUMMARIZATION AND DATA ROUTING

TECHNICAL FIELD

The present disclosure relates generally to efficient routing of data in an environment that employs IP Security and Security Parameter Index security protocols.

BACKGROUND

The rise of data networks such as the Internet has led to the explosive growth in data traffic over the last several decades. Data packets have been routed by network routers and switches using routing protocols and networking tools that have been developed over decades. Network routing is the process of selecting a path across one or more networks. The principles of routing can apply to any type of network, from telephone networks to public transportation. In packet-switching networks, such as the Internet, routing selects the paths for Internet Protocol (IP) packets to travel from their origin to their destination. These Internet routing decisions are made by specialized pieces of network hardware called routers.

Routers can refer to internal routing tables to make decisions about how to route packets along network paths. A routing table records the paths that the packets should take to reach every destination that the router is responsible for. When a router receives a data packet, it reads the headers of the packet to see its intended destination. It then determines where to route the packet based on information in its routing tables. Routers perform this operation millions of times per second with millions of data packets. As a packet travels to its destination, it may be routed several times by different routers. Routing tables can either be static or dynamic. Static routing tables do not change. A network administrator manually sets up static routing tables. This essentially sets in stone the routes that the data packets take across the network, unless the administrator manually updates the tables.

Dynamic routing tables, on the other hand, update automatically. Dynamic routers use various routing protocols to determine the shortest and fastest paths. They also make this determination based on how long it takes packets to reach their destination. Dynamic routing requires more computing power than static routing, which is why smaller networks may rely on static routing. However, for medium-sized and large networks, dynamic routing is much more efficient.

In networking, a protocol is a standardized way of formatting data so that any connected computer can understand the data. A routing protocol is a protocol used for identifying or announcing network paths. The Internet Protocol (IP) specifies the origin and destination for each data packet. Routers inspect each packet's IP header to identify where to send it. The Border Gateway Protocol (BGP) routing protocol is used to announce which networks control which IP addresses, and which networks connect to each other. BGP is a dynamic routing protocol. BGP is a standardized exterior gateway protocol designed to exchange routing and reachability information among autonomous systems on a Wide Area Network (WAN) such as the Internet. BGP is classified as a path-vector routing protocol, and it makes routing decisions based on paths, network policies, or rule-sets configured by a network administrator. BGP used for routing within an autonomous system is called Interior Border Gateway Protocol, Internal BGP (iBGP). In contrast, the Internet application of the protocol is called Exterior Border Gateway Protocol, External BGP (eBGP).

In order to improve security of data routed across networks such as the Internet, security protocols have been developed such as IP security (IPsec), cryptographic key exchanges, etc. The current process for building a distributed IPsec head end is to separate control plane (IKEv2 speaker) from the data plane (IPsec ESP processor) using a load balancer to distribute traffic out to the correct ESP processor. Load balancing, however, is inherently more expensive than routing because it involves more state and involves state that changes more often and more quickly compared with standard data routing which involves less state and involves state that changes less frequently.

Therefore, there remains a need for techniques for efficiently distributing IPsec data packets in an efficient, cost-effective manner, while maintaining the security integrity of the transmitted data. Such techniques would preferably be effective in a networking environment that employs an Internet Key Exchange (IKE).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
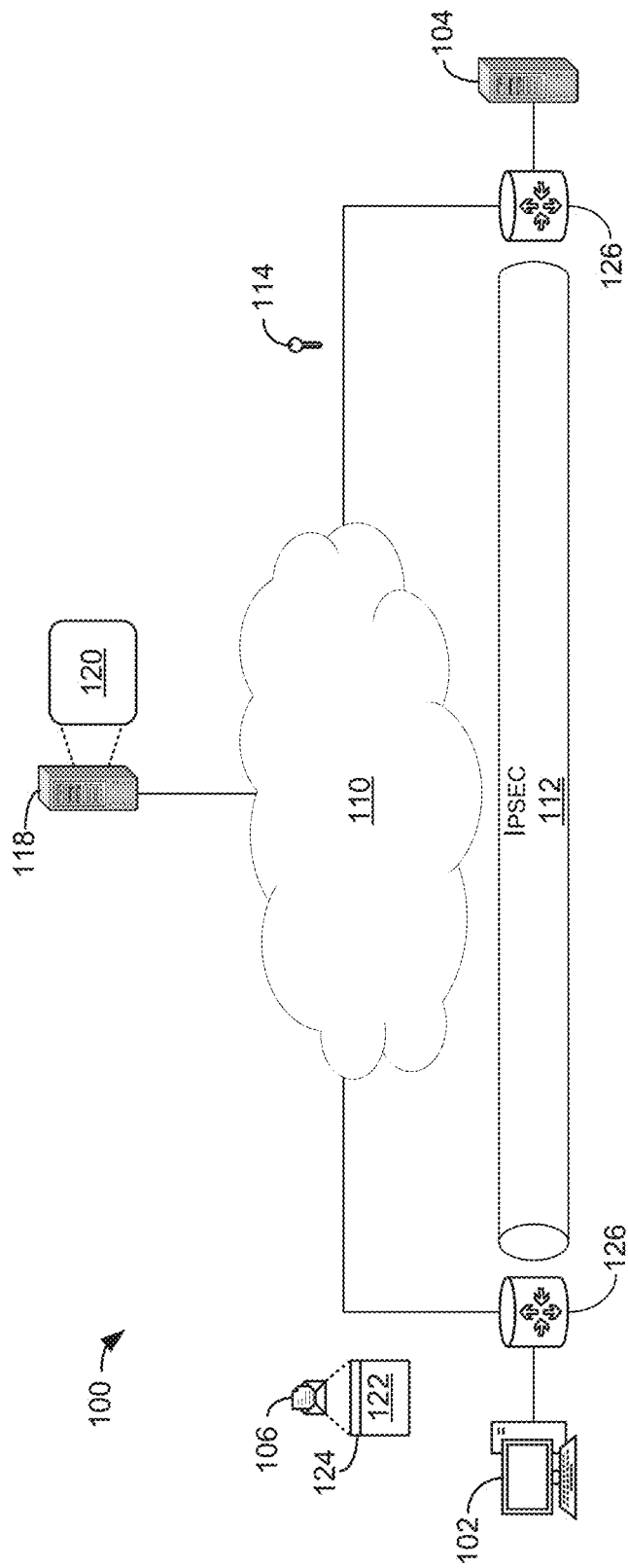
FIG. 1 is a schematic of a networking environment routing IPsec data packets to different ESP Processors using prefixes of an SPI header of each IPsec data packet.

This disclosure describes techniques for routing Internet Protocol security (IPsec) data packets that can be used in a system implementing an Internet Key Exchange (IKE), wherein the data packets can be routed using routing methods similar to traditional routing methods such as IPv4 routing protocols. An Internet Protocol Security (IPsec) data packet is generated having a Security Parameter Index (SPI). A prefix is assigned to the Security Parameter Index. The prefix includes routing information for routing the data packet to a particular Encapsulating Security Payload processor (ESP processor) of a plurality of ESP processors. The IPsec data packet is routed to the particular ESP processor based on the identity information included in the Security Parameter Index.

Additionally, the techniques described herein may be performed by a system and/or device having non-transitory computer-readable media storing computer-executable instructions that, when executed by one or more processors, performs the method described above.

Example Embodiments

Internet Protocol security (IPsec) is a group of protocols that are used together to set up encrypted connections between devices. It helps to keep data that is sent over public networks secure. IPsec is often used to set up Virtual Private Networks (VPNs), and it works by encrypting IP packets, along with authenticating the source where the packets came from.

Within the term IPsec, IP stands for "Internet Protocol", and sec stands for "secure". The Internet Protocol is the main routing protocol used on the Internet. It designates where data will go using IP addresses. IPsec is secure because it adds encryption and authentication to this process.

Encryption is the process of concealing information by mathematically altering data so that it appears random. In simpler terms, encryption is the use of a secret code that only authorized parties can interpret. A virtual private network (VPN) is an encrypted connection between two or more computers. VPN connections take place over public networks, but the data exchanged over the VPN is still private because it is encrypted.

VPNs make it possible to securely access and exchange confidential data over shared network infrastructures, such as the public Internet. For instance, when employees are working remotely instead of in the office, they often use VPNs to access corporate files and applications.

Many VPNs use the IPsec protocol suite to establish and run these encrypted connections. However, not all VPNs use IPsec. Another protocol for VPNs is SSL/TLS, which operates at a different layer in the OSI model than IPsec. The OSI model is an abstract representation of the processes that make the Internet work.

Users can access an IPsec VPN by logging into a VPN application or client. This typically requires the user to have installed the application on their device. VPN logins are usually password-based. While data sent over a VPN is encrypted, if user passwords are compromised, attackers can log into the VPN and steal this encrypted data. Using multi-factor authentication can strengthen IPsec VPN security, since stealing a password alone will no longer give an attacker access.

IPsec connections include multiple steps, one being an Internet Key Exchange (IKE). Cryptographic keys are necessary for encryption. A key is a string of random characters that can be used to lock (encrypt) and unlock (decrypt) messages. IPsec sets up keys with a key exchange between the connected devices, so that each device can decrypt the other's messages.

Packet headers are also used. All data that is sent over a network is broken down into smaller pieces called packets. Packets contain both a payload, or the actual data being sent, and headers, or information about that data so that computers receiving the packets know what to do with them. IPsec adds several headers to data packets containing authentication and encryption information. IPsec also adds trailers, which go after each packet's payload instead of before.

IPsec provides authentication for each packet, like a stamp of authenticity on a collectible item. This ensures that packets are from a trusted source and not an attacker. IPsec encrypts the payloads within each packet and each packet's IP header (unless transport mode is used instead of tunnel mode). This keeps data sent over IPsec secure and private.

Encrypted IPsec packets travel across one or more networks to their destination using a transport protocol. At this stage, IPsec traffic differs from regular IP traffic in that it most often uses User Data Protocol (UDP) as its transport protocol, rather than Transmission Control Protocol (TCP). TCP sets up dedicated connections between devices and ensures that all packets arrive. UDP, does not set up these dedicated connections. IPsec uses UDP because this allows IPsec packets to get through firewalls. At the other end of the communication, the packets are decrypted, and applications such as browsers can now use the delivered data.

In networking, a protocol is a specified way of formatting data so that any networked computer can interpret the data. IPsec is not one protocol, but a suite of protocols. The following protocols make up the IPsec suite.

The Authentication Header (AH) protocol ensures that data packets are from a trusted source and that the data has not been tampered with, like a tamper-proof seal on a consumer product. These headers do not provide any encryption and do not help conceal the data from attackers.

Encapsulating Security Protocol (ESP) encrypts the IP header and the payload for each packet unless transport mode is used, in which case it only encrypts the payload. ESP adds its own header and trailer to each data packet.

Security Association (SA) refers to a number of protocols used for negotiating encryption keys and algorithms. One of the most common SA protocols is Internet Key Exchange (IKE). While the Internet Protocol (IP) is not part of the IPsec suite, IPsec runs directly on top of IP.

IPsec tunnel mode is used between two dedicated routers, with each router acting as one end of a virtual tunnel through a public network. In IPsec tunnel mode, the original IP header containing the final destination of the packet is encrypted, in addition to the packet payload. To tell the intermediary routers where to forward the packets, IPsec adds a new IP header. At each end of the tunnel, the routers decrypt the IP headers to deliver the packets to their destinations.

In transport mode, the payload of each packet is encrypted, but the original IP header is not. Intermediary routers are thus able to view the final destination of each packet, unless a separate tunneling protocol such as Generic Routing Encapsulation (GRE) is used.

A network port is the virtual location where data goes in a computer. Ports are how the computers keep track of different processes and connections. If data goes to a certain port, the computer's operating system knows which process it belongs to IPsec usually uses port 500.

Maximum Segment Size (MSS) and Maximum Transition Unit (MTU) are two measurements of packet size. Packets can only reach a certain size (measured in bytes) before computers, routers and switches cannot handle them. MSS measures the size of each packet's payload, while MTU measures the entire packet, including headers. Packets that exceed a network's MTU may be fragmented, meaning that they are broken up into smaller packets and then reassembled. Packets that exceed the MSS are simply dropped.

IPsec protocols add several headers and trailers to packets, all of which take up several bytes. For networks that use IPsec, either the MSS and MTU has to be adjusted accordingly, or packets will be fragmented and slightly delayed. Usually, the MTU for a network is 1,500 bytes. A normal IP header is 20 bytes long, and a TCP header is also 20 bytes long, meaning that each packet can contain 1,460 bytes of payload. However, IPsec adds an Authentication Header (AH), and ESP header, and associated trailers. These add 50-60 bytes to a packet or more.

The techniques described herein address routing of data packets in an Internet Protocol security (IPsec) environment employing Internet Key Exchange (IKE) to ensure security of data delivered between devices over a network. A data packet is generated having a Security Parameter Index (SPI) header. The SPI header has a prefix that includes routing information for routing the data packet to a particular Service Parameter Index processor (SPI processor). The data packet can be routed to its intended destination using the SPI index using standard routing protocols such as Internet Protocol version 4 (IPv4) routing protocol rather than by using load balancing, thereby providing much simpler routing than would be possible using load balancing alone.

Current state of the art for building a distributed IPsec head end is to separate the control plane (e.g. IKEv2 speaker) from the data plane (IPsec EXP processor) using a load balancer to fan traffic out to the correct ESP processor. Load balancing is inherently more expensive than routing because it involves more state and involves state that changes more often and more quickly. Routing, by contrast, involves less state, and less change or movement of state. As a result, routing is much more efficient and cost effective than load balancing. In an IPsec system, a data packet having an Encapsulating Security Payload (ESP) header includes a Security Parameter Index (SPI) in the header. The SPI allows the receiver of the ESP data packet to distinguish which IPsec Security Agreement applies to the data packet.

The size of an SPI is 32 bits, which is conveniently the same size as an IPV4 address. Therefore, by breaking up the SPI space into prefixes analogous to IPv4 address prefixes, an IPsec data packet can be routed using well-established, cost effective routing protocols rather more expensive, more complicated load balancing. Because the SPIs are being routed in a manner that is analogous to IPv4 addresses, Boarder Gateway Protocol Virtual Private Networking (BGP VPN) protocol can be used to distribute ISP data packets to a variety of SPI routers and/or processing devices. Existing Virtual Routing and Forwarding (VRF) infrastructures can be used to store and process SPI routes. The SPI router or device only needs to change the field in the ISP of the data packet that it is applying the route, using SPI rather than a destination IP address. This manner of using SPI for data routing in a manner similar to IPv4 routing the use of well-established routing techniques that have been developed over decades, including fast reconvergence onto backup ESP processors. Well established Equal Cost Multi-Path (ECMP) routing techniques can be employed to route to the SPI router or processing device.

Internet Key Exchange (IKE) is a standard protocol used to set up a secure and authenticated communication channel between two parties via a virtual private network (VPN). The protocol ensures security for VPN negotiation, remote host and network access. A critical role of IKE is negotiating security associations (SAs) for IP Security (IPsec). SAs are security policies defined for communication between two or more entities. A set of algorithms and mutually agreed-upon keys are used and represented by both parties when attempting to establish a VPN tunnel or connection. Currently there are two IKE standards: IKE protocol defined in RFC 2409; and IKE version 2 (IKEv2) defined in RFC 7296.

Most often, IKE uses x.509 public key infrastructure (PKI) certificates for authentication and a Diffie-Hellman key exchange protocol to establish a shared secret session. A hybrid protocol, IKE, also implements two earlier security protocols, Oakley and SKEME, within an Internet Security Association and Key Management Protocol (ISAKMP) TCP/IP-based framework.

The SKEME protocol is an alternate version for the exchange key. ISAKMP RFC 2408 is used for negotiations, establishing security associations and securing connections between IPsec peers, specifying the framework for key exchange and authentication. Oakley RFC 2412 is used for key agreements or exchanges and defines the mechanism used over the IKE session for key exchange. Diffie-Hellman is the default algorithm used for exchange.

IKE is part of IPsec, a suite of protocols and algorithms used to secure sensitive data transmitted across a network. The Internet Engineering Tas Force (IETF) developed IPsec to provide security through authentication and encryption of IP network packets and secure VPNs.

In IPsec, IKE defines an automatic means for negotiation and authentication for IPsec SAs. This is required for the encryption and decryption process because it negotiates security. IKE offers several benefits for IPsec configuration, including automatic negotiation and authentication, anti-replay services, certification authority support and the ability to change encryption keys during an IPsec session.

The IKE protocol uses User Datagram Protocol (UDP) packets to create an SA, generally needing four to six packets with two to three messages. An IPsec stack intercepts relevant IP packets, encrypting and decrypting them as needed.

The original version of IKE sets up secure communications channels in two phases. In phase 1, an authenticated connection between the host and the user is established using a pre-shared key or a digital certificate. The goal is to secure the communications that occur in phase 2. The Diffie-Helman key exchange algorithm creates a secure authentication communication channel. This digital encryption method uses numbers raised to specific powers to produce decryption keys. The negotiation should result in session keys and one bi-directional Security Association (SA).

Phase 1 operates under one of two modes: main mode or aggressive mode. The main mode consists of both parties sending three two-way exchanges equaling six messages in total. The first two messages confirm encryption and authentication algorithms. The second set of two messages starts a Diffie-Hellman key exchange, where both parties provide a random number. The third set of messages verifies the identities of each party.

Aggressive mode accomplishes the same task as the main mode but does so in just two exchanges of three messages. Whereas the main mode protects both parties identities by encrypting them, the aggressive mode does not.

Phase 2 of IKE negotiates a Security Exchange (SA) to secure the data that travels through IPsec, using the secure channel created in phase 1. The result is a minimum of two SAs that are unidirectional. Both parties also exchange proposals to determine which security parameter to use in the SA.

Phase 2 operates in only one mode, quick mode. Quick mode provides three resources: (1) proxy IDs: (2) perfect forward secrecy (PFS); and (3) replay protection. The proxy IDs of each participant are shared with each other. PFS delivers keys independent from preceding keys. Replay protection is a security method to protect against replay attacks.

The main and aggressive modes found in phase 1 only apply to IKE version 1 and not to IKE version 2. IKE version 1 came out in 1988 and was followed by the released IKE version 2 in 2005. IKE version 2, updated in 2014, negotiates and authenticates IPsec SAs and provides secure VPN communication channels between devices. This version does not include phases 1 or 2 like its predecessor, but message exchanges still negotiate an IP see tunnel. The first of the four messages is a negotiation to decide a security attribute. The second is where each party authenticates its identity. The third includes the creation of additional SAs. The fourth message removes SA relationships, detects IPsec tunnel liveliness and reports errors.

FIG. 1 is a schematic illustration of a system 100 for implementing Internet Protocol security (IPsec) with Internet Key Exchange (IKE). The system 100 ensures secure data communication between a first computer device 102 and a second computer device 104. A data packet 106 can be transmitted between user devices 102, 104 through a network 110. The network 110 can be a Wide Area Network (WAN) such as the Internet. In other embodiments, the network 110 can be a private network such as an enterprise network, datacenter, etc. The Server 118 and Internet Key Exchange Service 120 can be a cloud-based system residing within the network 110 or could be remote from the network 110. The data packet 106 can be transmitted through a virtual tunnel, which can be an IPsec virtual tunnel 112.

IKE can be implemented in a user group associated with a task group that includes the proper task IDs. The command reference guides include the task IDs required for each command. In order to implement IKE a user or manager can activate a package installation envelope (PIE) for the security software.

Internet Key Exchange (IKE) is a key management protocol that is used in conjunction with IP Security (IPSec). IPSec is a feature that provides robust authentication and encryption of IP data packets. IKE is a hybrid protocol that implements the Oakley key exchange and the SKEME key exchange inside the Internet Security Association and Key Management Protocol ISAKMP) framework. (ISAKMP, Oakley, and SKEME are security protocols implemented by IKE. IPSec can be configured without IKE, but IKE enhances IPSec by providing additional features, flexibility, and ease of configuration for IPSec.

In order to provide added security of the data transmitted between the computer devices 102, 104, the system 100 can implement an Internet Key Exchange (IKE). As an example, a cryptographic key 114 can be created and delivered to the computer device 104 to access data from the computer device 102. In one embodiment, distribution and management of cryptographic keys can be managed by one or more servers 118 having logic and/or computer memory to provide a key management service 120. The server 118 and key management service 120 can act as an escrow service for managing the Internet Key Exchange (IKE) to provide security of data transfer between the computer devices 102, 104.

Each of the data packets 106, 108 can include a Security Parameter Index (SPI) 122 that can be used to help implement the IPsec and IKE processes to ensure secure transfer of data. The SPI 122 can include a header 124 that can be configured with a unique prefix (not shown in FIG. 1) that is configured to facilitate routing and processing of the IPsec data packet 106, 108 as will be described in greater detail herein below. In one embodiment, the IPsec data packet 106, 108 can be routed by a network router or network switch 126.

The IPsec data packet 106, can be routed using the prefix of the SPI header 124 in a manner analogous to standard routing protocols such as IPv4 routing protocols. This advantageously allows the IPsec data packet 106 to be routed by the router 126 without the need for costly and cumbersome load balancing techniques.

IPSec is a group of protocols that are used together to set up encrypted connections between devices. IPSec helps to keep data sent over public networks, such as the network 110, secure. IPSec can be used to set up Virtual Private Networks (VPNs) such as through IPSec tunnel 112, and it works by encrypting IP packets such as packet 106, along with authenticating the source where the packets come from such as source or destination devices 102, 104.

Within the term IPSec, IP stands for "Internet Protocol" and Sec stands for "Secure". The Internet Protocol is the main routing protocol used on the Internet. It designates where data will go using IP addresses. IPSec is secure because it adds encryption and authentication to this process. Encryption is the process of concealing information by mathematically altering data so that it appears random. In simpler terms, encryption is the use of a secret code that only authorized parties can interpret.

A virtual private network (VPN) is an encrypted connection between two or more computers, such as through the tunnel 112 of FIG. 1. VPNs make it possible to securely access and exchange confidential data over a shared network infrastructure, such as the public Internet. For instance, when employees are working remotely instead of in an office, they often use VPNs to access corporate files and applications.

Users can access an IPSec VPN by logging into a VPN application or client, such as the service 120 residing in the one or more servers 118. This typically requires the user to have installed the application on their device (e.g. 102, 104). VPN logins can be password-based. While data sent over a VPN is encrypted, if the user passwords are compromised, attackers can log into the VPN and steal this encrypted data. Using multi-factor factor authentication can strengthen IPSec VPN security, since stealing a password alone will no longer give an attacker access.

Encryption employs a key exchange. A key is a string of random characters that can be used to lock (encrypt) and unlock (decrypt) messages. IPSec sets up a keys 114 with a key exchange between the connected devices, so that each device can decrypt the other device's messages.

All data that is sent over the network 110 is broken down into smaller pieces called packets such as packet 106. Packets contain both a payload 122, or the actual data being sent, and headers 124 which include information about that data so devices such as routers 126 know what to do with that data packet 106. IPSec adds several headers to data packets 106, 108 containing authentication and encryption information. IPsec can also add trailers (not shown), which of after each packet's payload instead of before.

Figure 2:
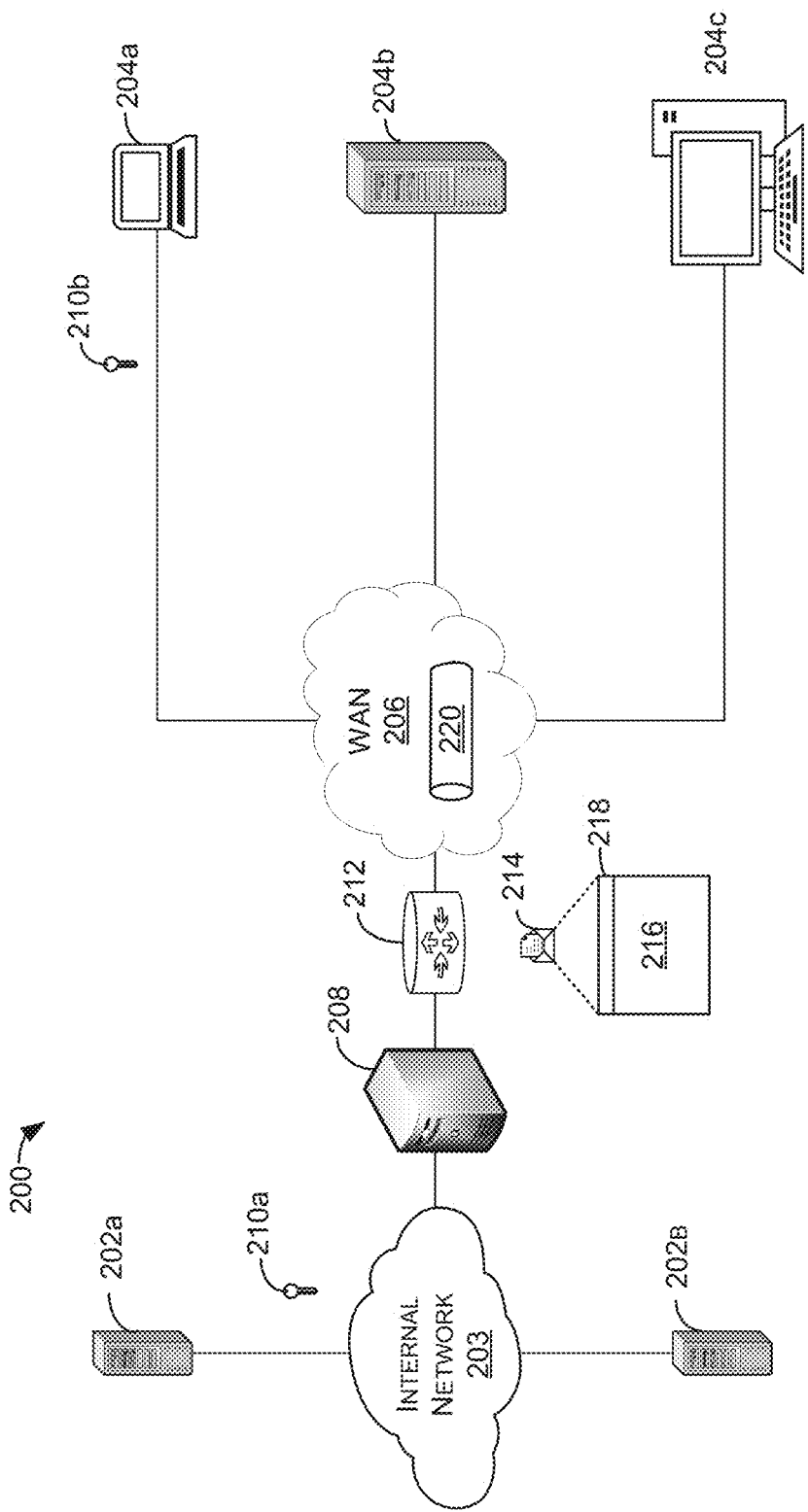
FIG. 2 is a schematic of a networking environment routing IPsec data packets over a WAN and implementing Internet Key Exchange (IKE).

FIG. 2 is a schematic illustration of a computer network architecture 200 for routing IPsec data packets according to another embodiment. Computer devices 202a, 202b are connected with an internal network 203. The internal network 203 can be a Local Area Network (LAN) such as an enterprise network or data center and can be a private network. The computer devices 202a, 202b can be connected with computer devices 204a, 204b, 204c through an external Wide Area Network (WAN) 206 such as the Internet.

Data traffic between the internal network 203 and the devices 204a, 204b, 204c can be routed through a router or network switching device capable of managing a Security Parameter Index (SPI) which can be referred to as an SPI router 208. The system 200 employs an Internet Key Exchange (IKE) security protocol described above. According to the IKE protocol, cryptographic keys are exchange between devices 202, 204 to allow access to data transmitted between them. By way of example, device 202a receives a cryptographic key 210a that is specific to device 204a and which allows device 202a to access data transmitted from device 204a. Similarly, device 204a can receive a cryptographic key 210b that allows device 204a to access data from device 202a.

In one embodiment, the SPI server 208 can manage the exchange and distribution of keys 210a, 210b to various devices 202, 204 for allowing access to data exchanged between them. In another embodiment, the devices 202, 204 themselves can generate and exchange cryptographic keys 210a. 210b. In yet another embodiment, the management of the exchange of keys 210a 210b can be performed by one or more cloud-based servers, such as within the WAN network (e.g., Internet) 206.

The system 200 can further include one or more routers 212 configured to route an IPsec data packet 214 between one or more of the devices 202 and one or more of the devices 204. The data packet 214 can include a packet header Security Parameter Index (SPI) that has a prefix that is configured to allow routing of the data packet 214 through the network 206 to a desired device 204. Although the data packet 214 is an IPsec data packet having a Security Parameter Index (SPI) 218, the SPI 218 has a prefix that is configured to allow routing of the data packet 214 using common, well established routing protocols such as IPv4. In one embodiment, the SPI server 208 can be operable to assign prefixes to SPIs 218 of the headers 216 of data packets 214 in order to allow distribution of data packets 214 through various SPI routing devices of the network 206, thereby avoiding the need to load-balance the data packets 214 as they traverse the network 206 on their way to the desired device 204. In one embodiment, data traveling through the WAN network 206 can travel through an IPsec secure data tunnel such as a Virtual Private Network (VPN) 220.

The IPSec protocol's objective is to provide security services for data packets 214, such as encrypting sensitive data, authentication, protection against replay and data confidentiality. Encapsulating Security Payload (ESP) and Authentication Header (AH) are the two IPSec security protocols used to provide these security services. IPSec can be configured to operate in two different modes, Tunnel and Transport mode. Use of each mode depends on the requirements and implementation of IPSec.

IPSec tunnel mode is the default mode. With tunnel mode, the entire original packet is protected by IPSec. This means that IPSec wraps the original packet 214, encrypts it, adds a new IP header and sends it to the other side of the VPN tunnel (IPSec peer) 220. Tunnel mode is most commonly used between gateways (such as routers 212 or firewalls), or at an end-station to a gateway, wherein the gateway acts as a proxy for the host behind it.

Tunnel mode is used to encrypt traffic between secure IPSec Gateways, for example two routers connected over the Internet via the IPSec VPN 220. In this example, each router acts as an IPSec Gateway for the LAN 204, providing secure connectivity to the remote network.

Another example of tunnel mode is an IPSec tunnel between a VPN client and an IPSec Gateway. The client connects to the IPSec Gateway. Traffic from the client is encrypted, encapsulated inside a new IP packet and sent to the other end. Once decrypted by the firewall appliance, the client's original IP packet is sent to the local network (e.g., 203).

In tunnel mode, an IPSec header (AH or ESP header) is inserted between the IP header and the upper layer protocol. Between AH and ESP, ESP is most commonly used in IPSec VPN Tunnel configuration.

IPSec Transport mode is used for end-to-end communications, such as for communication between a client and a server or between a workstation and a gateway when the gateway is being treated as a host. Transport mode provides the protection of data, also known as IP Payload, and consists of TCP/UDP header plus Data, through an AH or ESP header. The payload is encapsulated by the IPSec headers and trailers. The original IP headers remain intact, except that the IP protocol field is changed to ESP or AH, and the original protocol value is saved in the IPSec trailer to be restored when the packet is decrypted.

Figure 3:
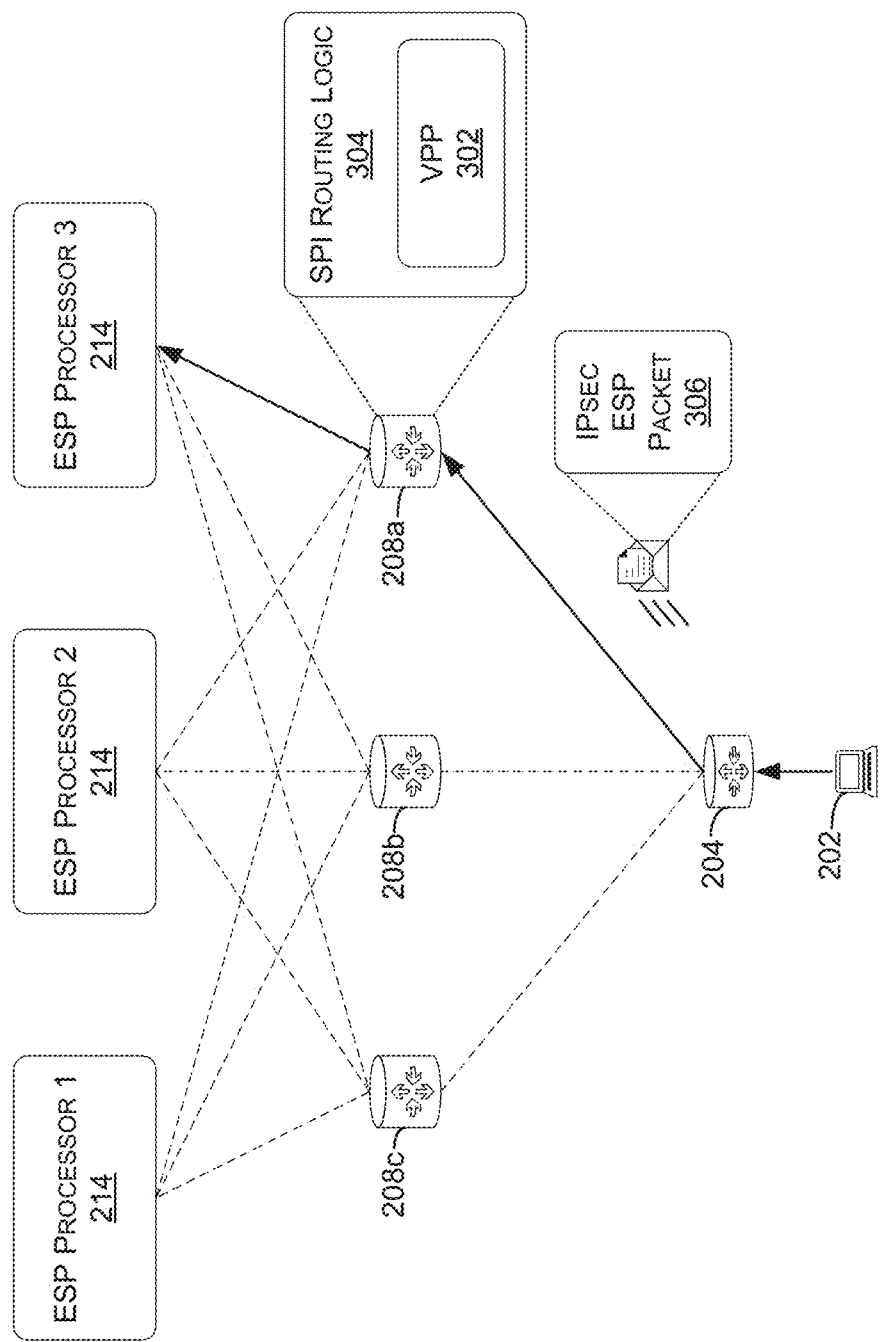
FIG. 3 is a schematic illustration showing IPsec data distribution and routing according to an embodiment.

FIG. 3 is a schematic illustration of a network architecture for routing and processing IPsec data to multiple ESP processors. FIG. 3 shows a user device 202 connected with a routing device 204 such as a network router or routing switch. The routing device 204 routes an IPSec data packet 306 to one or more routing devices 208a, 208b, 208c. The data packet 306 can be an IPsec data packet including Encapsulating Security Payload (ESP). At least one of the routing devices 208 includes Security Parameter Index (SPI) logic 304, as well as Vector Packet Processing (VPP) logic 302.

In one embodiment, the IPsec data packet 306 can be routed according to an Anycast methodology. Anycast is a network addressing and routing methodology in which a single destination IP address is shared by devices such as servers in multiple locations. Routers direct packets addressed to this destination to the location nearest the sender, using their normal decision-making algorithms, typically the lowest number of BGP network hops. Anycast routing is widely used by content delivery networks such as web and DNS hosts, to bring their content closer to end users.

The SPI is a 32-bit number that is used to uniquely identify a particular Security Association between connected devices. The Security Association is an agreement between two devices regarding how to protect information during communication. It also indicates the parameters, such as keys and algorithms. SPI provides a mechanism for the destination device to identify which SA to use to check the security of the received packet. The SPI is provided to map the incoming packet to an SA at the destination.

As mentioned above, the SPI is a 32-bit number. This is conveniently the same size as a standard IPv4 address. Therefore, if the SPI is broken up into prefixes analogous to IPv4 prefixes, standard routing protocols (IPv4) can be used to route the data packet 306. This avoids the need to use more costly and time-consuming load balancing techniques to route the data packet 306.

As mentioned above, at least one routing device 208a can include Vector Packet Processing logic 302. Vector Packet Processing (VPP) is an extensible, open-source framework, which offers the functionality of network switches or routers. Vector processing is the process of processing multiple data packets at a time, with low latency. VPP uses the data plane development kit of many device drivers and libraries for many of its layer 1 function. However, this functionality is separated into an optional plugin for VPP.

In order to push for scalability of networks, VPP reads the largest available sector of packets in the networks I/O layer. Instead of processing each packet individually throughout an entire graph with several nodes, VPP selects the entire vector of packets and pushes them through a graph node, before moving on to the next node. The instruction cache then adapts to the process and the remaining packets are processed even faster, due to the previously learned instructions form the first vector packet.

The routing device 208*a* routes the IPsec ESP data packet 306 to one of a plurality of ESP processor devices 214. The routing device routes the data packet 306 based on information in the previously described prefix of its SPI header of the IPSec data packet 306. The SPI header includes a specially configured prefix for facilitating routing of the data packet 306 and will be described in greater detail herein below. In one embodiment, the routing device 208*a* generates the index of the SPI header in order to most efficiently distribute IPsec data packets among the plurality of ESP processors. The routing devices 208 can be network routers, network switches, servers, etc. Similarly, the ESP processors 214 can be network routers, network switches, servers, etc.

Figure 4:
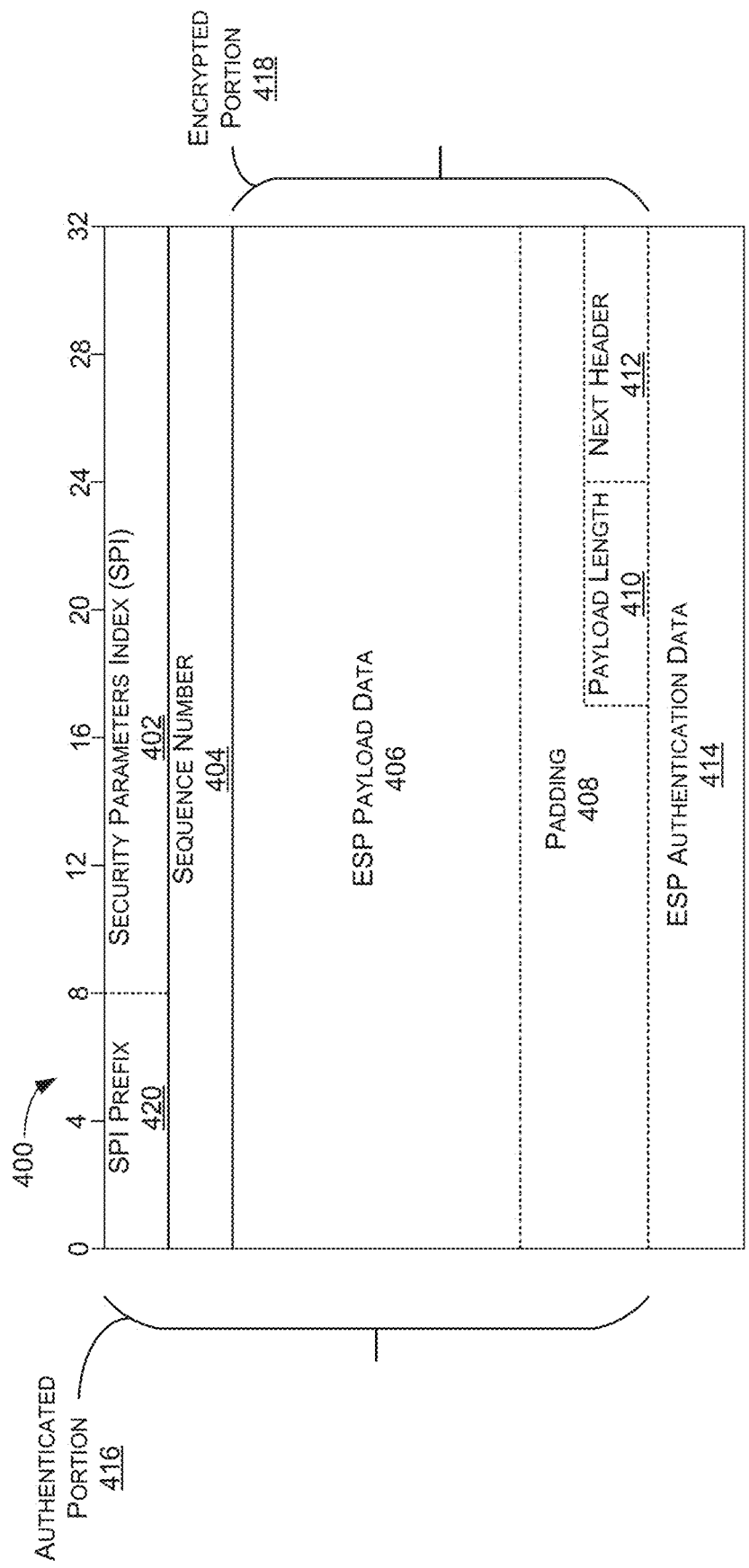
FIG. 4 is a graphical illustration of an IPsec data packet according to an embodiment, wherein the IPsec data packet has an SPI header with a prefix configured to facilitate routing of the IPsec data packet an ESP Processor.

FIG. 4 shows a graphical illustration of an IPsec data packet 400 according to an embodiment. The data packet 400 includes a Security Parameter Index (SPI) 402, a sequence number 404, Encapsulating Security Payload (ESP) payload data 406, padding 408, payload length data 410, next header data 412, and ESP authentication data 414. Bracket 416 indicates a portion of the data packet 400 that is requires authentication, and bracket 418 indicates a portion of the data packet 400 that is encrypted.

Encapsulating Security Payload (ESP) is defined by RFC 4303 and has a protocol number 50 and doesn't have any ports. ESP allows encryption of IP packet on the network layer carrying, for example, Layer 4 TCP traffic. In IPSec transport mode, the original header is retained and just the Layer 4 payload carried by the IP packet is encrypted. The ESP header is inserted between the original IP header and the encrypted payload. Originally intended for protecting direct IPV6 host-to-host connections, transport mode is currently mainly used to secure the Layer 2 Tunneling Protocol (L2TP). In IPSec Tunnel mode, the complete IP packet is encapsulated by ESP and an outer IP header is prepended.

An ESP packet consists of an ESP header, the encrypted IP payload body and an ESP trailer needed for padding. The Authentication Data field appended at the end as a cryptographic checksum guarantees data integrity.

The 32 bit Security Parameter Index (SPI) 402 is used by the receiving IPsec peer as an index into its kernel-based database to look up the session keys needed to decrypt and authenticate the ESP packet. The SPI is also needed to determine the IPSec security policy that has to be enforced on the inbound plaintext IP packets after decryption.

The security parameter index 402 is a 32-bit header (extending from 0-32 in FIG. 4). Coincidentally and conveniently, this is the same bit size as a header used for conventional routing such as using IPv4 routing protocols. Because of this, the security parameter index 402 can be adapted so as to route the data packet 400 in a manner analogous to conventional routing protocols such as IPv4 routing protocols. As previously described, the Security Parameter Index 402 can be configured with a unique SPI prefix 420 which can be specifically configured to provide routing information. Various data packets 400 can be configured with different SPI prefixes 420 to allow the various SPI data packets to be efficiently distributed to different ESP processors.

Figure 5:
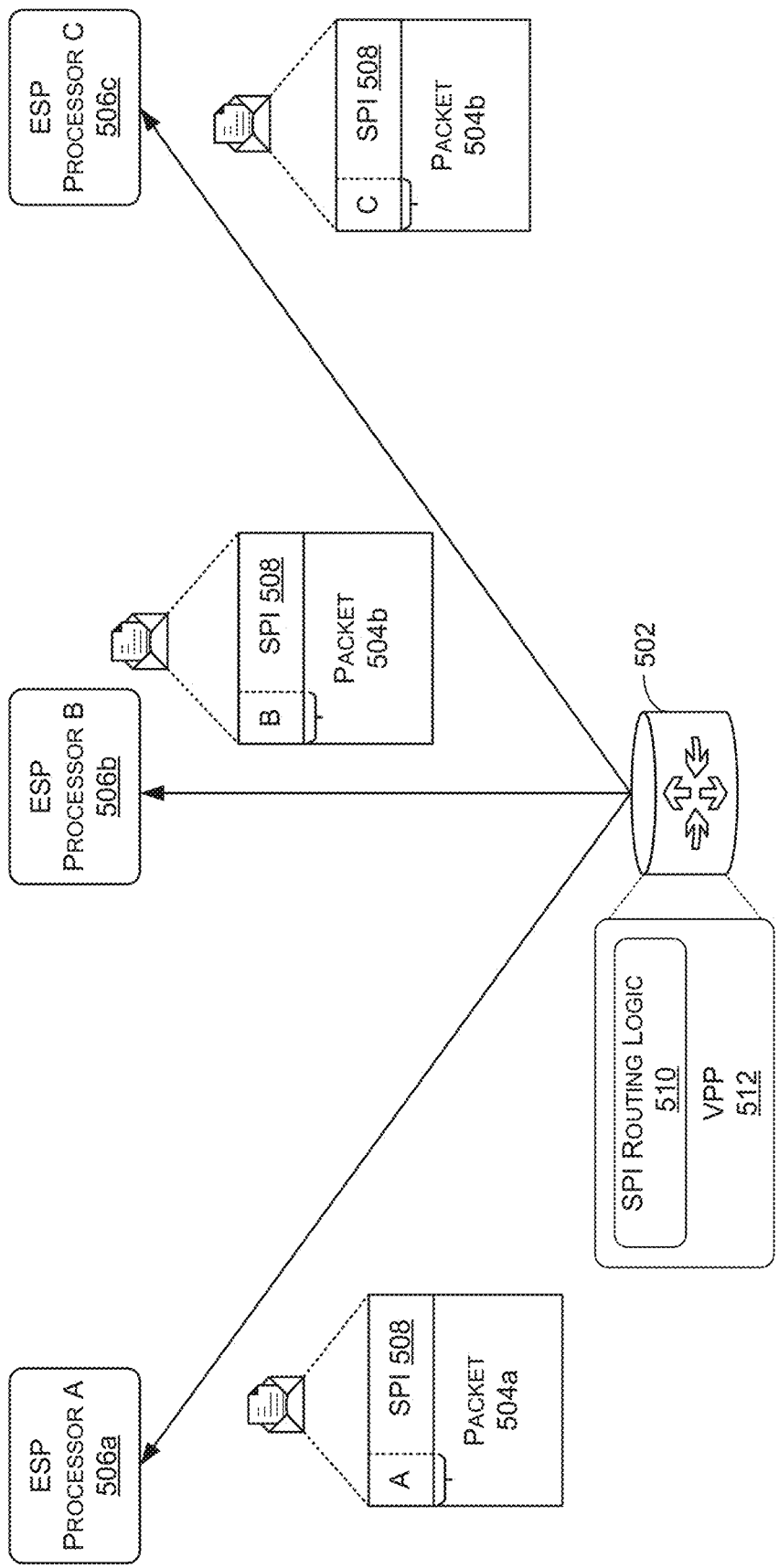
FIG. 5. is a schematic illustration showing IPsec data packets being routed to ESP processors according to an embodiment.

FIG. 5 shows a network routing device 502 distributing a plurality of SPI data packets 504*a*, 504*b*. 504*c* to various ESP processors 506*a*, 506*b*, 506*c*. The ESP processors 506 can be network routers, network switches, etc. The data packets 504*a*, 504*b*, 504*c* each have an SPI header 508, and each SPI header is configured with a prefix (e.g. A, B, C) that is configured to provide routing information to allow the data packet 504*a*, 504*b*, 504*c* to be routed to a desired ESP processor 506*a*, 506*b*, 506*c*. While only three data packets 504 and three ESP processors 506 are shown in FIG. 5, this is merely by way of example. A larger number of data packets 504 could be routed to a larger number of ESP processors 506. The prefix of the SPI header 508 can be configured to allow the data packets 504 to be routed using routing techniques that are analogous to standard routing techniques such as IPv4 routing protocol which may be performed without the need for more expensive load balancing.

The network routing device 502 includes Vector Packet Processing (VPP) Logic 512 for routing the data packets 504*a*, 504*b*, 504*c* to the various ESP processors 506*a*, 506*b*, 506*c*. The VPP Logic 512 includes SPI Routing Logic 510 for routing the packets 504*a*, 504*b*, 504*c* to its assigned ESP Processor 506*a*. 506*b*, 506*c* based on the prefix assigned to the SPI header 508 of each of the packet 504*a*, 504*b*, 504*c*. In this way, the routing device 502 does not need to determine which ESP Processor 506*a*, 506*b*, 506*c* to route each data packet to, such as by load balancing, but merely recognizes the previously assigned prefix of the SPI 508 and routes the data packet to the corresponding ESP Processor 506*a*, 506*b*, 506*c*.

This use of conventionally analogous routing takes advantage of the fact that a Security Parameter Index (SPI) is a 32-bit header, which is the same number of bits in an IPV4 header. Taking advantage of this allows the IPsec Data Packet to be routed using the prefix of the SPI header using a routing protocol that similar to or analogous to IPv4 routing protocol, with no need for more expensive load balancing, or at least with reduced reliance on more expensive load balancing. In one embodiment, this routing of IPsec data packets 504 can be performed in a system that employs an Internet Key Exchange (IKE). In one embodiment, the prefix of the SPI header 508 can be assigned by an Internet Key Exchange management service. According to one embodiment, the data packet 504 can be routed using Equal Cost Multi-Path (ECMP) routing, using the information in the prefix of the Security Parameter Index. In one embodiment, the data packet 504 can include an initiator's Security Parameter Index (SPI) and a responder's Security Parameter Index (SPI), and the prefix that includes the routing information can be a part of the responder's Security Parameter Index.

Figure 6:
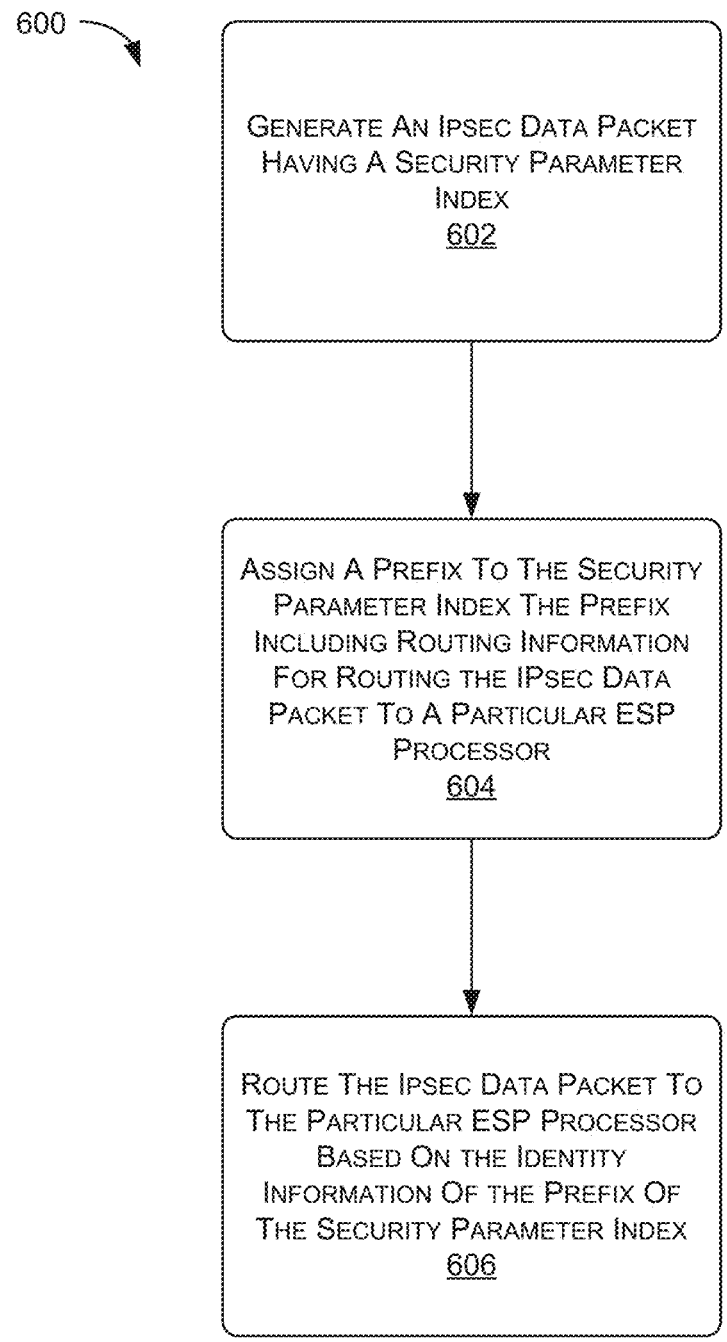
FIG. 6 shows a flow chart illustrating a method for routing an IPsec data packet using a specially configured prefix of an SPI header of the IPsec data packet.

FIG. 6 illustrates a flow diagram of an example of a method 600 that illustrates aspects of the functions performed at least partly by the devices described in FIGS. 1-5. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 is a flow diagram illustrating a method 600 for routing IPsec data packets using routing protocols that are analogous to conventional IP routing protocols such as IPv4 routing protocol without the need for relying entirely on load balancing to distribute IPsec data packets to various Encapsulating Security Payload (ESP) processors. A data packet is generated, the data packet having a Security Parameter Index (SPI) 602. The SPI can be included as a header of the data packet. A prefix is assigned to the Security Parameter Index 604. The prefix includes routing information for routing the IPsec data packet to a particular Encapsulating Security Payload (ESP) processor of a plurality of ESP processors. The data packet is routed to the particular ESP processor based on the information in the prefix of the Security Parameter Index 606. Because the data packet includes the information in the prefix of the Security Parameter Index, the data packet can be routed using information in the prefix of the Security Parameter Index in a manner that is analogous to conventional routing protocols such as IPv4 routing protocols without the need for load balancing. In one embodiment, the IPSec data packet includes an initiator's security parameter index and a responder's security parameter index.

In one embodiment, the data packet can be routed entirely by an IP routing protocol without the need for any load balancing. In another embodiment, load balancing can be employed but with reduced reliance on more expensive load balancing. The method can be employed in a system that employs an Internet Key Exchange (IKE). In one embodiment, the prefix can be assigned by an Internet Key Exchange Management service.

In one embodiment, the IPsec data packet can be routed using equal cost multi-path routing (ECMP) using the information in the prefix of the Security Parameter Index. In one embodiment, the data packet can include an initiator's Security Parameter Index (SPI) and a responder's Security Parameter Index (SPI) and the prefix that includes routing information can be a part of the responder's Security Parameter Index (SPI).

Figure 7:
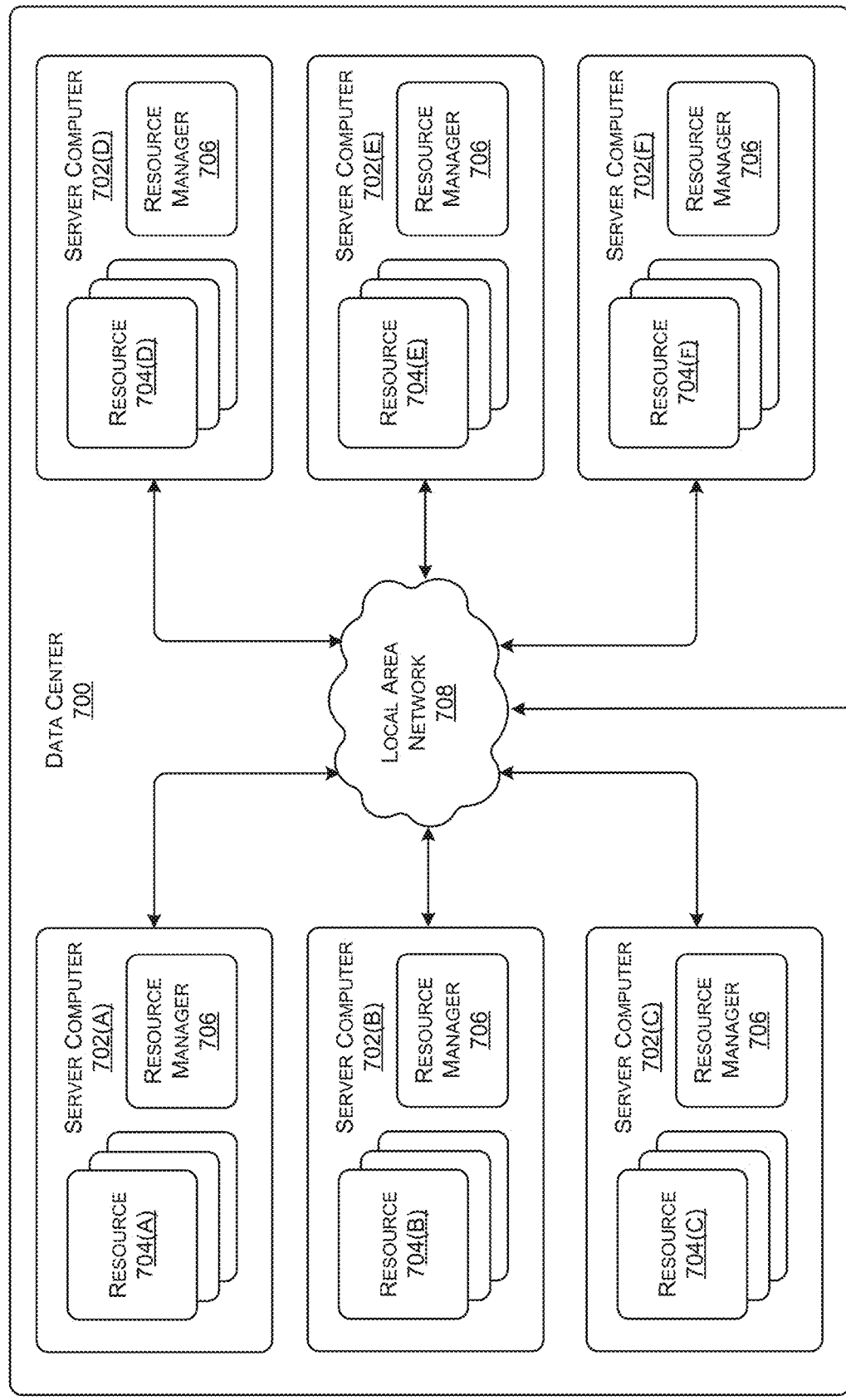
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
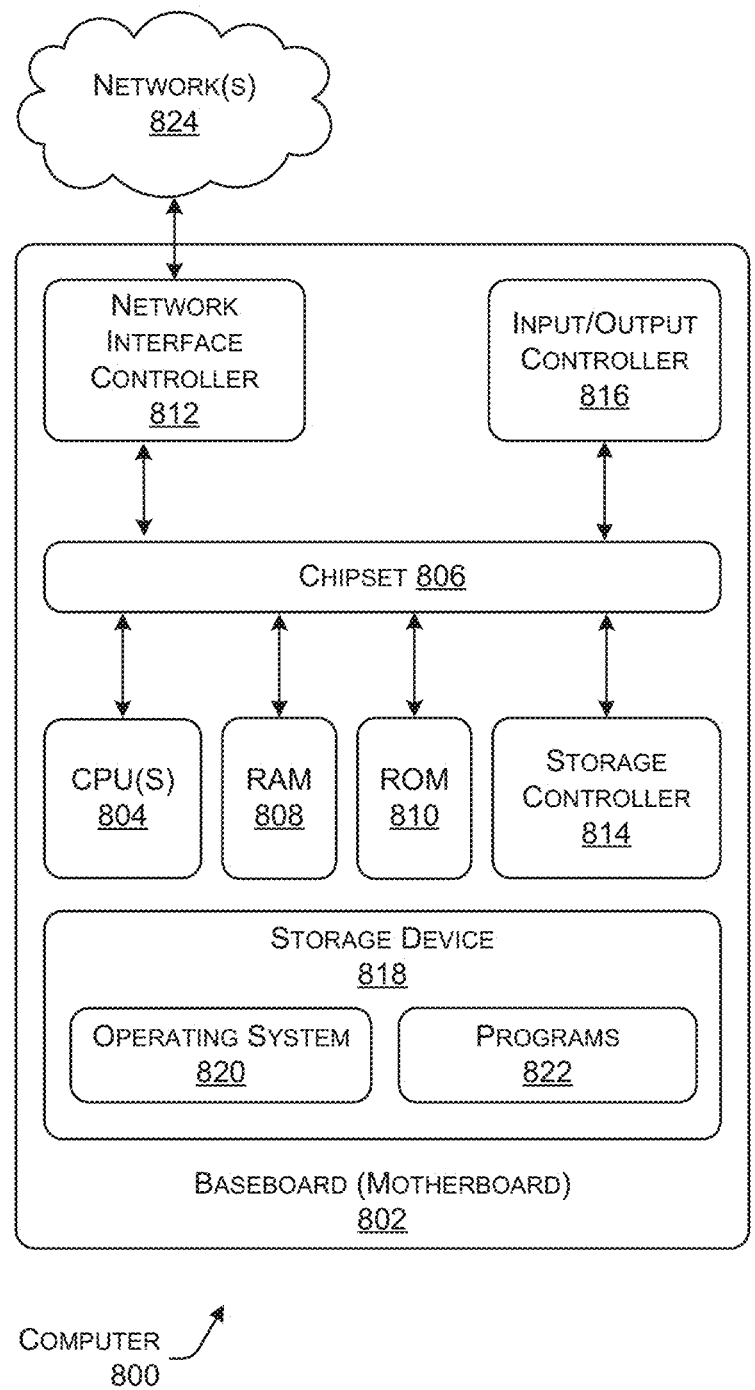
FIG. 8 is a computer architecture diagram showing an illustrative computer hardware architecture for implementing a computing device that can be utilized to implement aspects of the various technologies presented herein.

FIG. 8 shows an example computer architecture 800 for a computer such as the server computer 702 capable of executing program components for implementing the functionality described above. The computer architecture 800 shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network 824, such as the network 708 of FIG. 7. The chipset 806 can include functionality for providing network connectivity through a Network Interface Controller (NIC) 812, such as a gigabit Ethernet adapter. The NIC 812 is capable of connecting the computer 800 to other computing devices over the network 708 (and/or 102, 104, or 202). It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices in the distributed application architecture 100, and or any components included therein, may be supported by one or more devices similar to computer 702.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure. The programs 822 may comprise any type of program that cause the computer 800 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for routing Internet Protocol Security (IPsec) data packets, the method comprising:
   generating, an IPsec data packet having a Security Parameter Index;
   assigning a prefix to the Security Parameter Index, the prefix providing routing information for routing the IPsec data packet to a particular Encapsulating Security Payload Processor (ESP processor) of a plurality of ESP processors; and
   routing the IPsec data packet to the particular ESP processor based on the routing information of the prefix of the Security Parameter Index.

2. The method as in claim 1, wherein the IPsec data packet is routed using logic analogous to Internet Protocol version 4 (IPv4) routing protocol.

3. The method as in claim 1, wherein the IPsec data packet is routed to the particular ESP processor using routing logic.

4. The method as in claim 1, further comprising generating multiple IPsec data packets, and assigning different prefixes to each IPsec data packet.

5. The method as in claim 4, wherein the different prefixes are configured to distribute the multiple IPsec data packets to different ESP processors.

6. The method as in claim 1, wherein the IPSec data packet is routed using equal cost multi-path routing using the information in the prefix of the security parameter index.

7. The method as in claim 1, wherein the IPsec data packet includes an initiator's security parameter index and a responder's security parameter index and wherein the prefix that includes routing information is part of the responder's security parameter index.

8. A system for routing Internet Protocol Security (IPsec) data packets, the system comprising:
   one or more processors; and
   one or more non-transitory computer-readable media storing computer-executable instructions that, when executed by the one or more processors, cause the one or more processors to perform operations comprising:
   generating, an IPsec data packet having a Security Parameter Index;
   assigning a prefix to the Security Parameter Index, the prefix providing routing information for routing the IPsec data packet to a particular Encapsulating Security Payload Processor (ESP processor) of a plurality of ESP processors; and
   routing the IPsec data packet to the particular ESP processor based on the routing information of the prefix of the Security Parameter Index.

9. The system of claim 8, wherein the IPsec data packet is routed using logic analogous to Internet Protocol version 4 (IPv4) routing protocol.

10. The system of claim 8, wherein the IPsec data packet is routed to the particular ESP processor using routing logic.

11. The system of claim 8, the operations further comprising generating multiple IPsec data packets, and assigning unique prefixes to the multiple IPsec data packets.

12. The system of claim 11, wherein the unique prefixes are configured to distribute the multiple IPsec data packets to different ESP processors.

13. The system of claim 8, wherein the IPSec data packet is routed using equal cost multi-path routing using the information in the prefix of the security parameter index.

14. The system of claim 8, wherein the IPsec data packet includes an initiator's security parameter index and a responder's security parameter index and wherein the prefix that includes routing information is part of the responder's security parameter index.

15. One or more non-transitory computer-readable media storing computer-executable instructions that, when executed by one or more processors, cause the one or more processors to perform operations comprising:
    generating, an Internet Protocol Security (IPsec) data packet having a Security Parameter Index;
    assigning a prefix to the Security Parameter Index, the prefix providing routing information for routing the IPsec data packet to a particular Encapsulating Security Payload Processor (ESP processor) of a plurality of ESP processors; and
    routing the IPsec data packet to the particular ESP processor based on the routing information of the prefix of the Security Parameter Index.

16. The one or more non-transitory computer-readable media of claim 15, wherein the IPsec data packet is routed using logic analogous to Internet Protocol version 4 (IPv4) routing protocol.

17. The one or more non-transitory computer-readable media of claim 15, wherein the IPsec data packet is routed to the particular ESP processor using routing logic.

18. The one or more non-transitory computer-readable media of claim 15, further comprising generating multiple IPsec data packets, and assigning unique prefixes to the multiple IPsec data packets.

19. The one or more non-transitory computer-readable media of claim 18, wherein the unique prefixes are configured to distribute the multiple IPsec data packets to different ESP processors.

20. The one or more non-transitory computer-readable media of claim 15, wherein the IPsec data packet is routed using equal cost multi-path routing using the information in the prefix of the security parameter index.

\* \* \* \* \*